United States Patent [19]
Goto et al.

[11] Patent Number: 5,172,173
[45] Date of Patent: Dec. 15, 1992

[54] IMAGE FORMING DEVICE AND TRANSFER BELT HAVING CONTACT-TYPE ELECTRICITY FEEDING MEANS

[75] Inventors: Masahiro Goto, Kawasaki; Koichi Hiroshima, Yokohama, both of Japan

[73] Assignee: Canon Kabushiki Kaisha, Tokyo, Japan

[21] Appl. No.: 401,121

[22] Filed: Aug. 31, 1989

[30] Foreign Application Priority Data

Sep. 1, 1988 [JP] Japan ................. 63-216330
Oct. 20, 1988 [JP] Japan ................. 63-262768

[51] Int. Cl.$^5$ ............................................ G03G 15/16
[52] U.S. Cl. ........................ 355/275; 355/274; 355/276
[58] Field of Search ............ 355/275, 274, 271, 281, 355/273, 279, 277, 212

[56] References Cited

U.S. PATENT DOCUMENTS

| | | | |
|---|---|---|---|
| 2,576,882 | 11/1951 | Koole et al. | 198/1 |
| 3,244,083 | 4/1966 | Gundlach | 95/1.7 |
| 4,351,640 | 9/1982 | Schaffer et al. | 8/524 |
| 4,389,112 | 6/1983 | Ogata et al. | 355/274 X |
| 4,407,580 | 10/1983 | Hashimoto et al. | 355/275 |
| 4,571,052 | 2/1986 | Shirai | 355/274 |
| 4,956,676 | 9/1990 | Fukae et al. | 355/271 |

FOREIGN PATENT DOCUMENTS

| | | | |
|---|---|---|---|
| 56-154772 | 11/1981 | Japan . | |
| 62-156682 | 7/1987 | Japan . | |
| 62-203169 | 9/1987 | Japan . | |
| 0083765 | 4/1988 | Japan | 355/275 |

*Primary Examiner*—A. T. Grimley
*Assistant Examiner*—T. A. Dang
*Attorney, Agent, or Firm*—Fitzpatrick, Cella, Harper & Scinto

[57] ABSTRACT

An image forming device is provided with an image carrier and a transfer material adsorber and conveyor. The conveyor is provided for attaching a transfer material by an electrostatic force and for conveying in a first direction the transfer material to a position in which the image carrier is brought into contact at a transfer site. The conveyor comprises an electrical field generator for generating an electrical field downstream of the contact point with respect to the first direction. The electrical field generator is arranged on a side opposite to a surface in contact with the transfer material on the conveyor. The electrical field generator comprises a contact-type electricity feeder. An insulating layer is provided having a volume resistivity of at least $10^{14}$ Ωcm arranged on the side of the surface in contact with the image carrier, and a high resistance layer is further provided having a volume resistivity of between $10^8$ to $10^{14}$ Ωcm. A surface potential of the side in contact with the transfer material resulting from the electrical field generator has a potential gradient having a peak proximate to a position downstream of the contact point with respect to the first direction.

6 Claims, 4 Drawing Sheets

IMAGE FORMING DEVICE AND TRANSFER BELT HAVING CONTACT-TYPE ELECTRICITY FEEDING MEANS

BACKGROUND OF THE INVENTION

1. Field of the Invention:

This invention relates to an image forming device utilizing electrophotographic process such as an electrostatic copying machine, a printer, etc. and a transfer belt to be used for these image forming devices.

2. Related Background Art:

There has been already proposed an image forming device which is constituted such that a transfer material is electrostatically adsorbed and conveyed on the surface dielectric layer of a transfer drum, etc., brought along to the transfer site where an image carrying member exists and the toner image formed on the image carrying member by the electrical field from a transfer belt, etc. is transferred onto the transfer material, as can be seen in U.S. Pat. Nos. 2,576,882 and 3,244,083.

Such a device is constituted so as to transfer the toner image by generating a transfer electrical field by discharging by means of a corona discharger from the back of the insulating transfer belt, and also is provided with a corona discharger for having the transfer material electrostatically adsorbed onto the transfer belt prior to the transfer charging.

The device which performs electrostatic transfer by having the transfer material electrostatically adsorbed onto the surface of a dielectric material layer such as the above device sometimes suffers from defective adsorption of the transfer material defective transfer due to accumulation of charges of the opposite polarity to the transfer electrical field on the surface of the dielectric material is caused peeling discharging during separation of the transfer material from the image carrying member after transfer and thereafter during separation of the transfer material from the transfer belt.

In order to avoid such situation, as disclosed in Japanese Patent Publication No. 61-40990, there have been known the method in which the potential in which the dielectric material surface is stabilized by effecting alternating current discharging onto the dielectric material surface. Another method is known in which the surface potential is stabilized by performing corona discharging with alternate current or corona discharging with direct current of different polarities from each other from the surface and the back of the dielectric material in a multiple transfer system such as multicorona copying, etc.

However, such methods not only generate a large amount of corona products by corona discharging, particularly ozone to deteriorate the surface of the dielectric material and also have deleterious influences on the image carrying member. Also corona discharging onto a dielectric material is poor in potential stability, extremely unstable and depending highly on the environment because of having no standard potential surface, particularly when the transfer belt, etc. consist only of a dielectric material.

For prevention of such troubles by corona discharging, for example, Japanese Patent Application Laid-open No. 56-15477 discloses a technique in which a transfer belt surface in contact with the transfer material is formed on an insulating layer of $10^{10}$ Ω cm or higher. Moreover, the back is made of an electroconductive layer of $10^8$ Ω cm or lower, which electroconductive layer is grounded to contact charge the insulating layer.

This one is excellent in potential stability of the dielectric surface, since the electroconductive layer acts as the standard potential surface to effect contact charging.

However, in this case, since the electrical field intensity of contact charging is high, and therefore if there is any defect such as a pinhole in the insulating layer, high voltage leakage will occur. Moreover for example, when an electroconductive brush is used as the charging means, defective transfer will occur due to shortage in charging over that area.

Particularly, in the case of the transfer belt as described above, transfer efficiency is better as the insulating layer is thinner. Accordingly the thickness of said layer should preferably be 100 μm or less, but in such thin layer, it is extremely difficult to produce a layer without the pinhole. Since the transfer electrical field is formed only with surface charging in the constitution as described above, when the transfer material is lowered in resistance under high temperature and high humidity temperature, defective transfer, defective adsorption due to charge leakage onto the tranfer belt surface are liable to occur.

Further, as described above, due to uniform electrical field on the transfer belt surface, even at the position before the position where the image carrying member is in contact with the transfer belt, the action of attracting the toner of the image carrying member surface onto the transfer belt is exerted, whereby the toner will fly toward the transfer belt to effect unreliable transfer, but the so called "scattering" phenomenon occurs to bring about deterioration in image quality. If the electrical field intensity is weakened for prevention of this, there will be generated the "inner drop-out" phenomenon in which only the peripheral portion of linear image is transferred.

As the transfer belt, there have been known one shaped in a belt by seaming dielectric films such as polyethyleneterephthalate film, etc. by such means as thermal fusion, ultrasonic fusion, etc., and one having an electroconductive member such as aluminum, gold, tin oxide, carbon, etc. vapor deposited in the inner layer of the above dielectric film, one having the above film wound on a rubber such as NBR, SBR, EPDM, etc. which is made electroconductive.

As the endless belt, as shown in Japanese Patent Application Laid-open No. 62-156682, it has been disclosed to form an endless belt by providing a thermoplastic resin layer with a volume resistivity of $10^{14}$ Ω cm, or higher and a thermoplastic elastomer or ionomer of $10^6$ Ω cm or lower as its inner layer and extrusion blow molding both layers interally.

Further, Japanese Patent Application Laid-open No. 62-203169 discloses and endless belt, having a surface dielectric material layer of a thermoplastic elastomer or ionomer having a volume resistivity of $10^{12}$ to $10^{16}$ Ω cm and its inner layer of a semiconductive thermoplastic elastomer or ionomer having a volume resistivity of $10^7$ to $10^{12}$ Ω cm, both being integrated by extrusion blow molding.

However, the following problems are involved in the transfer belt of the above prior art. For example, in a system having a dielectric material film such as polyethylene-terephthalate thermally fused or sonication fused, due to the step difference at the seamed portion, the toner portion attached on the transfer belt is pooled there and cannot be completely cleaned to cause back staining of the transfer material, and further the problem occurs in durability because of weak strength of seam.

Also, in an insulating dielectric material film, it is difficult to stabilize the dielectric material surface potential. When the transfer material is peeled off from the electrostatic latent image carrier, charges of the opposite polarity to the transfer electrical field are accumulated on the dielectric material surface by peeling discharging during separation of the transfer material from the transfer belt, whereby the charge-up phenomenon may sometimes occur to give rise to defective adsorption of the transfer material, defective transfer of toner image.

On the other hand, as indicated in Japanese Patent Application Laid-Open Nos. 56-154772 and 56-150362, the constitution having an electroconductive layer provided on the back of the dielectric material film has been known to maintain constantly the surface layer by contact charging, corona charging, etc. with the electroconductive layer as the standard potential surface. In this system, the problem of the seam of the dielectric material film is the same as in the above prior art example, but the charge-up phenomenon hardly occurs. However, since it has an electrocoductive layer on the back, the electrical field on the transfer belt surface is uniform, and therefore the electrical field acts in the direction of attracting the toner on the elecrostatic latent image carrier toward the electrostatic latent image carrier before the contact between the image carrier and the transfer belt, whereby said toner flies away toward the transfer belt to effect an unreliable transfer of the toner image. Thus gives rise readily to the phenomenon of so called "scattering" (the state in which toner particles are scattered around the letter portion). If the electrical field on the transfer belt surface is weakened for preventing this phenomenon, there are such disadvantages that the so called "inner drop-out" phenomenon may occur in which only the peripheral portion of the letter portion is transferred, and that lowering in transfer efficiency is bought about.

In Japanese Patent Application Laid-open No. 62-156682, an endless belt having an electroconductive layer as the inner layer is disclosed, and since the belt is endless, the problem of the step difference of seam, etc. can be cancelled, but the drawbacks caused by having the electroconductive layer as the inner layer cannot be cancelled.

On the other hand, in the endless belt for transfer disclosed in Japanese Application Laid-open No. 62-203169, both the surface layer and the inner layer are formed of thermoplastic elastomer layers, and therefore there are posed problems of abrasion, deformation, elongation, etc. by prolonged successive uses, and in further worse case, there is also a problem that the transfer belt may be cut during successive uses. Also, the surface frictional resistance is great and cleaning characteristic of the transfer belt is inferior.

SUMMARY OF THE INVENTION

The present invention has been accomplished to cope with such state of the art. Its object is to provide an image forming device provided with a means for adsorbing and conveying a transfer material which performs transfer by the electrical field from said means, the device being little dependent on environment, can convey surely and stably the transfer material and also enables faithful transfer with high efficiency.

Another object of the present invention is to provide a belt for conveying, particularly a belt for transfer, which enables constantly stable adsorption of a transfer material with little environmental change to give high transfer efficiency and can transfer the toner image on an electrostatic latent image carrying member to give high image quality.

Still another object of the present invention is to provide a belt for transfer which is excellent in smoothness of the surface, excellent in cleaning characteristic of the toner attached on the belt for transfer and has the characteristic of standing prolonged usage.

For accomplishing the above objects, the present invention provides an image forming device provided with an image carrier and a transfer material adsorbing and conveying means for adsorbing and conveying the transfer material to this position with the transfer site being formed in contact therewith, having an electrical field generating means which generates an electrical field in the direction of moving the toner image on the image carrier to the transfer material arranged on the opposite side to the surface in contact with the transfer material of said transfer material adsorbing and conveying means.

Said image forming device comprises an insulating layer having a volume resistivity of $10^{14}$ $\Omega$cm or higher formed on the side in contact with said image carrier of said transfer material adsorbing and conveying means and a high resistance layer with a volume resistivity of $10^{14}$ $\Omega$cm or lower at the opposite side thereto.

Controlling the surface potential of a transfer material adsorbing and conveying means such as transfer belt to a desired potential gradient, the image forming device thus constituted has made it possible to practice a reliable transfer at a high transfer ratio without scattering or inner drop-out of toner, to effectively reduce in cost the transfer adsorbing and conveying means and the power source accompanied therewith, and to obtain a device with great durability.

Also, the transfer belt according to the present invention is a transfer belt comprising an insulating layer comprising a synthetic resin and a high resistance layer comprising a thermoplastic elastomer, said high resistance layer a volume resistivity of $10^8$ to $10^{14}$ $\Omega$cm, with the insulating layer being a resin layer selected from polyethyleneterephthalate, fluorine resin, polyethylene, polyamide, polyimide, polycarbonate, polysulfone.

By forming a transfer belt with an insulating layer or a rigid resin layer and forming a high resistance layer with a volume resistivity of $10^8$ to $10^{14}$ $\Omega$cm as the inner layer of the resin layer, said high resistance layer being formed of a thermoplastic layer, the charges within the high resistance layer can be readily removed. Therefore, the charge-up phenomenon will hardly occur. Moreover the transfer electrical field can be concentrated partially, whereby the toner image on the electrostatic latent image carrying member can be transferred at high transfer efficiency and faithfully to give high image quality.

Further, since the insulating layer has a resin layer having strong strengh and excellent abrasion resistance, permanent deformation, smoothness, and therefore a belt capable of paper passage over a long term can be obtained. Further, since the strength of the resin layer of the surface layer is strong, the thickness of the belt as a whole can be made sufficiently thin, and therefore a transfer electrical field with sufficient strength for the image carrying member can be obtained, and high transfer efficiency can be obtained with ease.

DESCRIPTION OF THE PREFERRED EMBODIMENTS OF THE INVENTION

Figure 1:
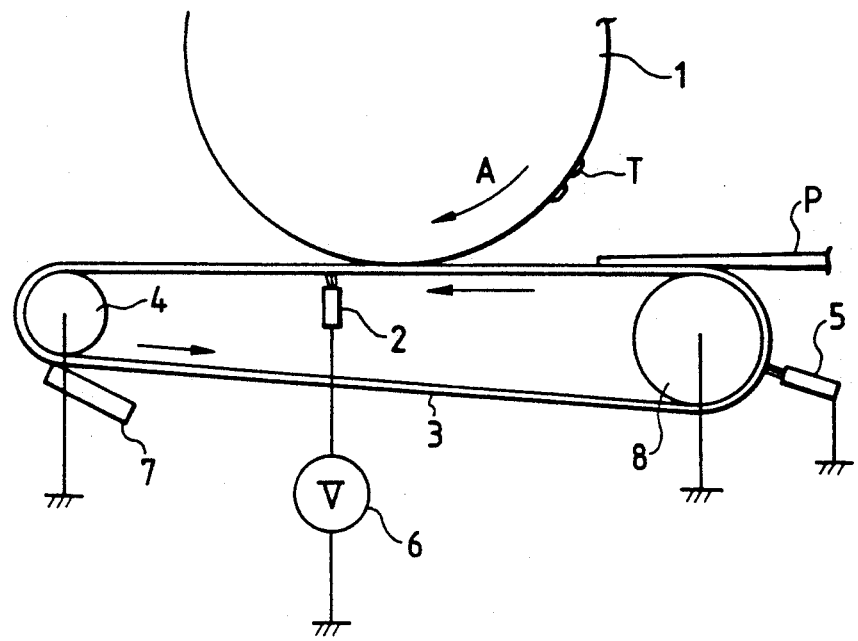
FIG. 1 is a schematic side view showing the constitution of the image forming device which is an example of the present invention.

FIG. 1 is a side view showing the constitution of the image forming device which is an example of the present invention, having a transfer belt 3 suspended between an electroconductive driving roller 4 and an electroconductive roller 8. The transfer belt 3 contacts with a photosensitive member 1 which carries a toner image T formed on the surface by the means well known in the art and rotates in the direction of the arrowhead shown, whereby they both run synchronously.

The transfer material P fed from the right side in the drawing is attached to its surface electrostatically by the transfer belt 3 as described below and runs together therewith. At the transfer site where the photosensitive member 1 is in contact with the transfer belt 3, the toner image of the photosensitive member is transferred by the electrical field from the transfer belt.

After transfer, the transfer material is separated from the photosensitive member 1, conveyed toward the left side as shown in the drawing together with the transfer belt 3, the curvature separated from the transfer belt 3 at the position of the driving roller 4 and further conveyed to the fixing site not shown.

The transfer belt 3 released of the transfer material is cleaned by a cleaning blade 7 to be ready for the next step.

To describe in more detail the exemplary device shown in the drawing, as the photosensitive member, an organic photoconductive member (OPC) may be used (of course, inorganic semiconductor such as selenium, amorphous silicon, cadmium sulfide, etc. are also available), and as the latent image forming means, a laser beam with image modulation used.

The developing system is according to reversal development by image exposure wherein negatively charged toner is attached onto the portion irradiated with laser beam.

Figure 2:
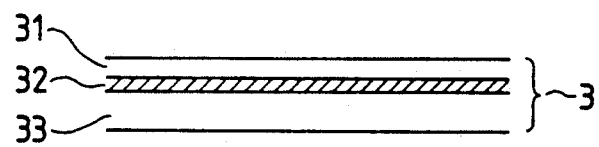
FIG. 2 is a cross-sectional view showing the constitution of the same transfer belt as above.

The transfer belt 3, having its cross-sectional view as shown in FIG. 2, comprises a three-layer constitution of an insulating layer 31, an adhesive layer 32 and a high resistance layer 33 from the side nearer to the photosensitive member 1. And A bias voltage is applied through an electroconductive electricity feeding brush 2 to the back surface of the high resistance layer 33 from the power source 6.

The insulating layer 31 of the transfer belt 3 has a volume resistivity of $10^{14}$ Ωcm or higher and a thickness of 20 to 150 μm, particularly preferably 20 to 70 μm, the adhesive layer 32 has a thickness within the range of 10 to 50 μm, and the high resistance layer 33 has a volume resistivity of $10^{14}$ Ωcm or less and a thickness of 50 to 300 μm, particularly preferably within the range of 50 to 200 μm.

The insulating layer 31 is formed by use of a resin such as polyethyleneterephthalate, tetrafluoroethylene-hexafluoro-propylene (FEP), tetrafluoroethylene-perfluoroalkoxyethylene (PFA), polyvinylidene fluoride, polyimide, polyamide, polycarbonate, polysulfone, polyimide, polyether ether ketone, etc. and its thickness is made between 20 and 150 μm, preferably between 20 to 70 μm.

The high resistance layer 33 is an elastomer layer comprising at least one elastomer such as a polyolefin type thermoplastic elastomer, a polyester type thermoplastic elastomer, a polystyrene type thermoplastic elastomer, a polyurethane type thermoplastic elastomer, a polyamide type thermoplastic elastomer, a fluorine type thermoplastic elastomer, a polybutadiene type thermoplastic elastomer, a polyethylene type thermoplastic elastomer, an ethylene-vinyl acetate type thermoplastic elastomer, a polyvinyl chloride type thermoplastic elastomer, etc., and for said elastomer, those containing electroconductive fillers such as carbon black, metal powder, etc. or semiconductive fillers such as titanium compounds, nickel compounds, silicon compounds, etc. mixed therein, those modified in structure of the polymer to make the elastomer itself higher in resistance, etc. may be used, and the volume resistivity of the elastomer layer at this time is controlled between $10^6$ and $10^{14}$ Ωcm and the thickness between 50 and 300 μm.

Also, as the high resistance layer, a rubbery material such as urethane, silicone, EPDM, chloroprene, etc. controlled to a desired resistance value may be used. The thickness of the high resistance layer at this time is made within the range of 0.1 to 1.0 mm.

The adhesive layer 32 can be selected suitably depending on the material of the insulating layer. The volume resistivity of the adhesive layer 32 should be desirably higher than the high resistance layer.

By use of the above materials, in the present invention, an endless belt is prepared by extrusion or centrifugal molding, etc. of the respective layers, and thereafter an adhesive is coated to plaster the insulating layer with the high resistance layer, or alternatively the respective layers can be molded simultaneously and integrally according to extrusion blow molding, and either method can be selected suitably depending on the materials employed.

By use of a thermoplastic elastomer with good moldability as the high resistance layer of the inner layer in this case, extrusion molding into any desired thickness of about 20 to 300 μm is rendered possible, whereby it becomes possible to obtain an endless belt having an optimum thickness for a belt for transfer at relatively lower cost.

The toner attached on the nonimage region or on the transfer belt during rotation other than during image formation is scraped off by the cleaning blade 7 as described above, and said blade should be preferably one made of, for example, urethane rubber, silicone rubber, etc., having a hardness of 50° to 90° (JIS A hardness), and it is arranged upstream side of the electroconductive brush 5 which is a deelectrifying means, with a roller 4 shown or a back-up member such as plate member having a considerable hardness being required to be arranged on the opposite side.

The above electricity feeding brush 2 and the electroconductive brush 5 are constituted of bundles of stainless steel, carbon fibers sandwiched between aluminum plates, with their volume resistance being made $10^6$ Ωcm or less. Also, as the electricity feeding brush 2 and the electroconductive brush 5, fibers of rayon, nylon, etc. controlled to an appropriate value of resistance by mixing carbons can be also used. Further, in place of brush, electroconductive roller, electroconductive rubber blade can be also used.

Since the electroconductive brush 5 is earthed as shown in the drawing, by arranging it as opposed to the electroconductive roller 8 similarly earthed, the surface charges on the transfer belt 3 can be sufficiently removed.

With such constitution as described above, by applying a bias of +500 to +3000 V, preferably +1000 to +2000 V, on the high resistance layer 31 of the transfer belt 3, adsorption conveying of the transfer material could be ensured and moreover good transfer efficiency of 75% or higher could be obtained.

In this case, by applying an alternate current bias of an interpeak voltage of 500 to 1500 V and a frequency of 100 to 2000 Hz or a bias voltage (direct current 300 to 1000 V) of the same polarity as the electricity feeding brush 2, deelectrification of the transfer belt can be effectively effected.

Figure 3A:
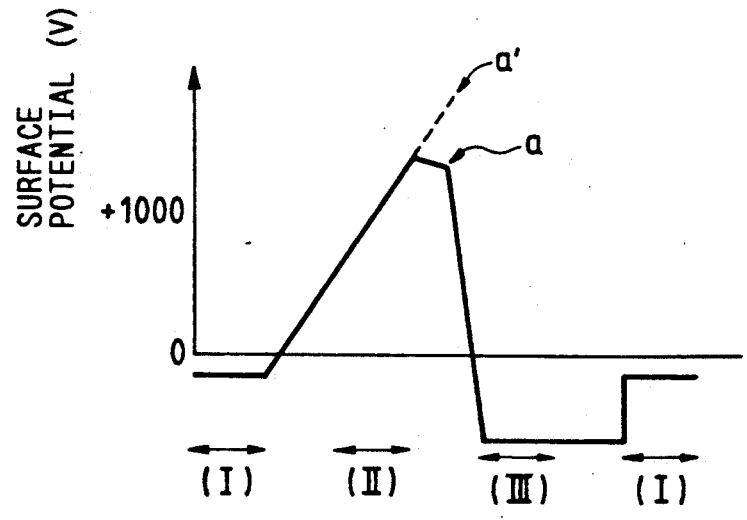
FIG. 3A and FIG. 3B are respectively a transfer belt surface potential gradient diagram and a sectionalized diagram of the surface of said belt of the above exemplary device.
Figure 3B:
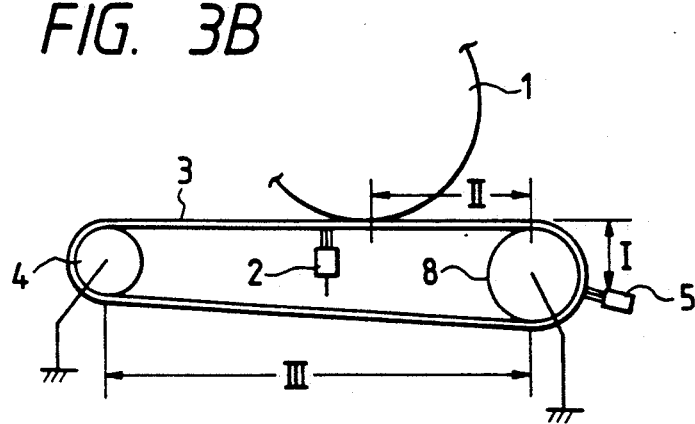

FIG. 3A shows sectionalization of the surface of the transfer belt shown in FIG. 1 into I, II and III as shown in FIG. 3B, and transition of the surface potential based thereon.

Here, for the purpose of simplicity, description is made about the case when no transfer material exists, but also when a transfer material exists, there is no change in the basic tendency of potential and hence action, except for slight shift of potential.

At the portion I where the electroconductive roller 8 and the electroconductive brush 5 are opposed to each other, the surface potential of the transfer belt is 0 V or slightly shifted to the negative polarity.

When the transfer belt 3 is departed from the electroconductive roller 8 and comes near the position where contacted with the photosensitive member 1 (between I and II in FIG. 3A), the charges injected from the electricity feeding brush 2 move within the high resistance layer 31 of the transfer belt 3, whereby a potential gradient as shown between I and II is generated.

By such potential gradient, the transfer material supplied to the transfer belt is surely held and conveyed on said belt, and also because of weak electrical field at the position remote from the photosensitive member 1, generation of "scattering" phenomenon of toner as mentioned above can be inhibited.

As nearer to the contact point between the transfer belt 3 and the photosensitive member 1, the surface potential of said belt is increased and transfer is effected where the transfer material is sufficiently in contact with the photosensitive member (the position II in the Figure).

The surface potential of the transfer belt should be further increased to reach the symbol a' shown in the Figure, but after transfer, since charges of the opposite polarity to the transfer potential are accumulated on the transfer belt by peeling discharging generated when the transfer material is separated from the photosensitive member, it reaches only as far as the symbol a.

In the intermediate from the above peek potential position toward the earthed electroconductive driving roller 4, a potential gradient in the direction of lowering the potential as shown in the Figure is generated, and at this time, the resistance of the high resistance layer of the transfer belt 3 is set so that the potential of said belt may be sufficiently approximate to 0 V at the portion where the transfer belt is in contact with said electroconductive driving roller.

With such constitution, the adsorbing action of the transfer belt to the transfer material at the separating position becomes smaller, whereby it can be easily separated from said belt.

In the section III in FIG. 3A, FIG. 3B, negative potential appears due to negative charges accumulated on the transfer belt surface, and since there is no potential difference between the both rollers 4, 8 which are earthed, a constant potential is maintained until deelectrified with the electroconductive brush.

For such action as described above to be performed smoothly, it is necessary that movement of charges within the high resistance layer of the transfer belt should be effected rapidly and adequately, and for this purpose, the volume resistance of the high resistance layer should be desirably within the range of $10^6$ to $10^{14}$ Ωcm, more preferably $10^8$ to $10^{12}$ Ωcm. The insulating layer of the transfer belt desirably has a small movement of charge to allow strong Coulomb force to act and the resistance thereof should be $10^{14}$ Ωcm or more, preferably $10^{16}$ Ωcm or more.

By setting in this way, adequate potential gradient, transfer potential necessary for transfer can be obtained, whereby the transfer material can be surely held and conveyed without "scattering" of toner.

A simple contact electricity feeding means such as electricity feeding brush can be used, and yet the voltage can be about 0.5 to 3 Kv (practically 2 Kv was applied) which is by far lower than the bias voltage of 4.0 to 8.0 Kv required in the case of known corona discharger, whereby the power cost can be lower and there is little adverse effect on the photosensitive member.

Further, as for surface potential stability of the transfer belt, by arranging the contact type electroconductive brush 5 on the surface to make the resistance of the high resistance layer on the back a value as mentioned above, environmental stability and durability can be made excellent, and further by controlling the resistance of the high resistance layer with a semiconductive inorganic material, improvement of environmental stability is particularly marked.

Figure 4:
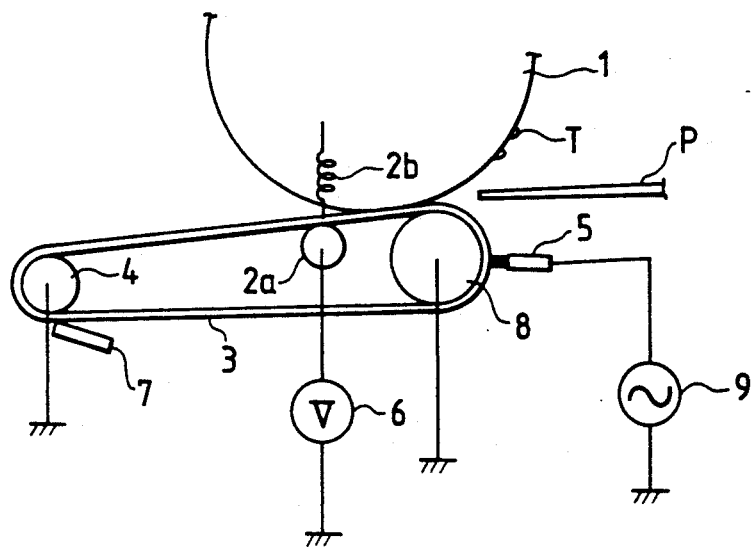
FIG. 4 is a side view of the image forming device showing another example of the present invention.

FIG. 4 shows another example of the present invention, in which the parts corresponding to those of the above example such as photosensitive member 1, transfer belt 3, rollers 4, 8 for suspending this, etc. are indicated with the same symbols, and description about them is omitted unless necessary (this is the same in the examples as described below).

In this example, the photosensitive member 1 is arranged at the position where it is in contact with the electroconductive elastic roller 8 through the transfer belt 3, and also as the means for applying voltage onto the high resistance layer of the transfer belt 3, the electroconductive roller 2a is used, which roller is press-contacted against the transfer belt with the spring 2b, whereby the photosensitive member 1 and the transfer belt 3 can be brought into pressure contact with each other to control the nip portion forming the transfer site.

On the electroconductive brush 5 for deelectrifying the surface insulating layer of the transfer belt 3 is applied an alternate voltage by the power source 9.

Figure 5A:
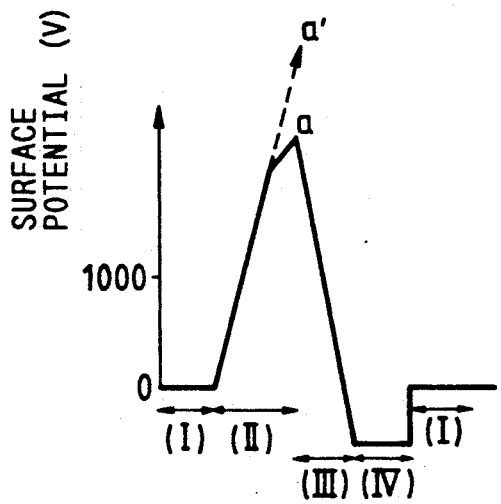
FIG. 5A and FIG. 5B are respectively a surface potential gradient diagram of the transfer belt of the above exemplary device and a sectionalized diagram of the surface of said belt.
Figure 5B:
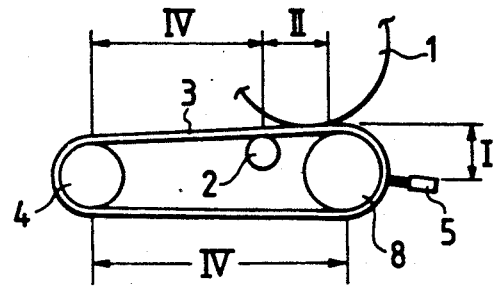

FIG. 5A and FIG. 5B show transition of the surface potential of the transfer belt in this device under the same conditions as in the example described above.

Since the surface of the belt 3 is deelectrified at the portion I in FIG. 5B, the potential is substantially 0 V as shown in FIG. 5A. As the applied voltage was used an alternate current with an interpeak voltage of 1200 V and a frequency of 800 Hz, and good deelectrifying action can be obtained when these values are within the ranges of 500 to 2000 V for interpeak voltage and of 100 to 2000 Hz for frequency.

Also, when an alternate voltage is thus applied, even if there may be pinhole in the insulating layer of the transfer belt, by setting the resistance of the high resistance layer of said belt within the range of $10^6$ to $10^{14}$ $\Omega$cm, the leak current can be sufficiently inhibited, and the power output will not be lowered.

At the portion II in FIG. 5A, since the photosensitive member 1 is in the press-contacted relationship with the electroconductive elastic roller 8, and therefore sufficient adhesion between the photosensitive member 1 and the transfer belt 3 is ensured and the potential prior thereto is surely maintained at 0 V, and after adhesion, the surface potential is elevated as shown in FIG. 5A to reach the peak at the position of the electroconductive roller 2a.

The symbols a, a' in FIG. 5B are invariable as in the case of potential transition in the example as described above. Also, potential changes at the portions III, IV occur according to the same tendency as in the example as described above.

This device has good adhesion between the photosensitive member and the transfer belt, and therefore inner drop-out can be prevented by applying a relatively higher voltage of 3 Kv on the electroconductive roller 2a.

Also, since there exists no electrical field in the transfer direction at the position before the transfer site, and the gradient at the portion where reaching the transfer potential is steep, faithful transfer of the toner image is made possible along with good adhesion between the photosensitive member and the transfer material.

As the electroconductive elastic roller 8 in the device of this example, there can be used an electroconductive rubber such as EPDM, CR and NBR, silicone rubber having a hardness of 20° to 50° (JIS A hardness), an electroconductive sponge such as urethane and silicone having a hardness of 15° to 40° (ASKER C hardness), of which resistance is controlled to $10^6$ $\Omega$ cm or lower, and for the objects of the present invention, it is preferable to use a sponge.

As the electroconductive roller 2a for applying transfer bias, a roller comprising a metal such as aluminum, stainless steel, iron, etc., or such roller coated with an electroconductive rubber with a resistance of $10^6$ $\Omega$ cm or lower can be employed.

As described above, the roller 2a is pressed by the spring 2b toward the transfer belt 3, and can control the length (as viewed in the running direction of the transfer material) and the pressure at the press-contacted nip portion between the photosensitive member 1 and the transfer belt 3, and hence it is suitable for improvement of transfer efficiency and prevention of inner drop-out.

Figure 6:
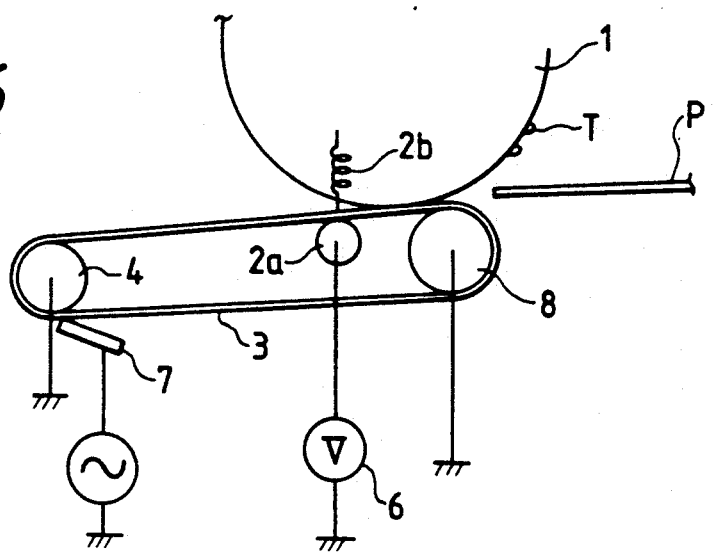
FIG. 6 and FIG. 7 are both schematic side views of other examples of the present invention.

FIG. 6 shows still another example of the present invention, and in this device, without use of an electroconductive brush as the deelectrifying means, it is constituted such that the cleaning blade 7 is made of an electroconductive rubber and an alternate current (or one having direct current of the same polarity as the transfer overlapped thereon) is applied thereon.

As the blade 7, an electroconductive rubber such as urethane, NBR, silicone, etc. may be employed, and one having a volume resistivity of $10^6$ $\Omega$ cm or lower and a hardness of 50° to 90° (JIS A) can be preferably used.

With such constitution, the constitution as a whole can be made simple.

Figure 7:
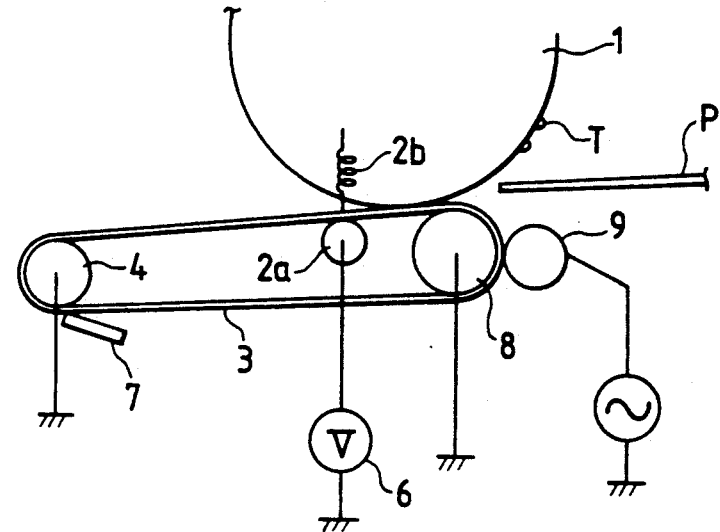

FIG. 7 shows still another example, and in this device, an electroconductive roller 9 is arranged as the deelectrifying means, and an alternate current or a voltage having a direct current overlapped on an alternate current is applied.

As the roller 9, an electroconductive rubber such as EPDM, silicone, chloroprene, etc. may be employed, and one having a volume resistivity of $10^6$ $\Omega$ cm or lower and a hardness of 30° to 70° (JIS A) can be preferably used.

According to this device, uniform deelectrification of the transfer belt surface is possible and a device having excellent durability can be obtained.

Figure 8:
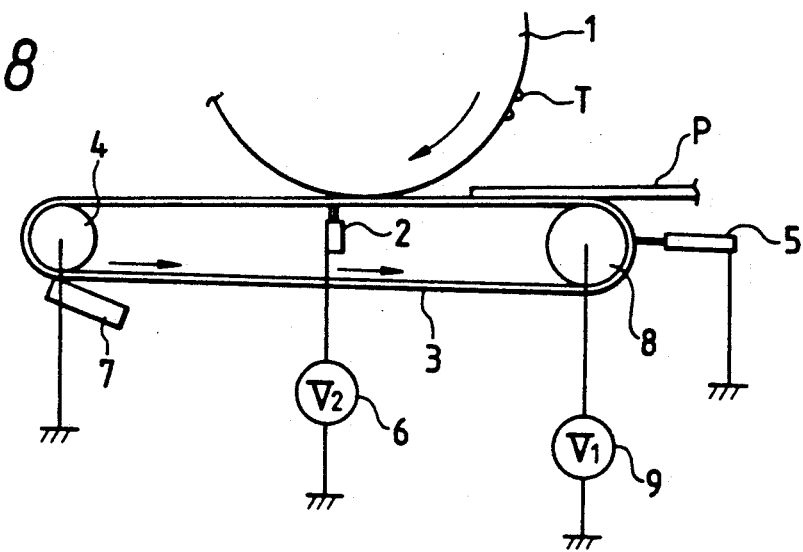
FIG. 8 is a schematic side view of the image forming device showing still another example of the present invention.

FIG. 8 shows still another example of the present invention.

In this device, a voltage of the opposite polarity to the transfer electrical field is previously applied on the electroconductive roller 8, and a transfer bias of the same polarity as the transfer electrical field is applied on the electricity feeding brush.

Figure 9A:
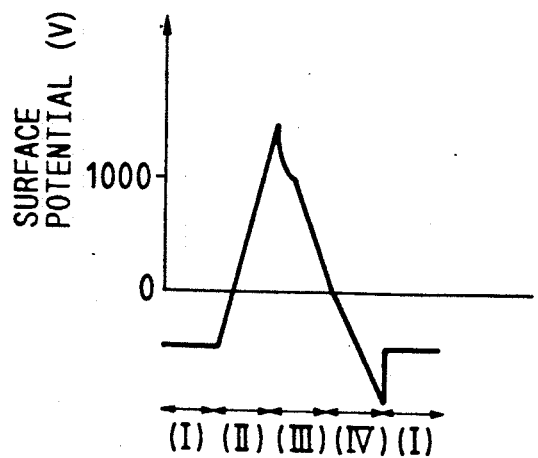
FIG. 9A and FIG. 9B are respectively a surface potential gradient diagram of the transfer belt of the above exemplary device and a sectionalized diagram of the surface of said belt.
Figure 9B:
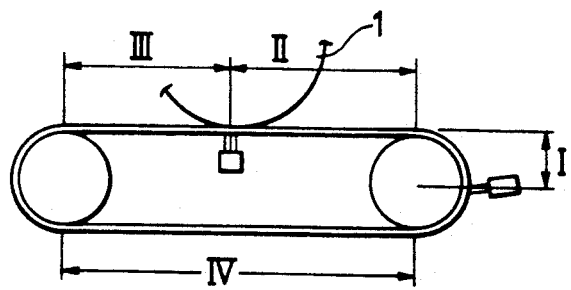

FIGS. 9A and 9B show transition of the surface potential of the transfer belt of the above device.

The portion I in the Figure is in contact with the electroconductive roller 8 on which the voltage of the opposite polarity to the transfer electrical field is applied, and at this time $-1000$ V is applied on said roller, whereby the transfer belt surface potential tends to approach 0 V through the deelectrification action by the electroconductive brush 5.

In the case of the device shown in the Figure, deelectrification is effected to about $-500$ V. In this case, it is also possible to make the voltage about 0 V by applying an alternate current or a voltage of the same polarity as the transfer electrical field on the electroconductive brush 5.

During the course when the transfer belt 3 is separated from the electroconductive roller 8 and reaches the transfer nip portion, at the portion of the symbol II, in the presence of the electricity feeding brush 2 on which a transfer bias of $+1000$ V is applied, a potential gradient is generated as shown in FIG. 9A. At the peak, the deelectrified voltage by the electroconductive brush 5 is added, whereby a surface voltage of about 1500 V appears.

Thus, by applying a voltage of the opposite polarity to the transfer electrical field on the electroconductive roller 8, the potential at the portion where the surface potential to attract the toner toward the transfer belt 3 appears can be controlled, whereby transfer before contact of the transfer material with the photosensitive member can be surely inhibited.

As can be understood from the above description, a desirable potential gradient can be obtained by controlling adequately the potentials of the three of the transfer site where the photosensitive member 1 and the transfer belt 3 are in contact with each other or the electroconductive member (electricity feeding brush 2 in the device shown) arranged in the vicinity of the downstream side as viewed in the running direction of said belt, the surface potential control member (the electroconductive brush 5) of the transfer belt 3 and the electroconductive member (the electroconductive roller 8).

By the peeling discharging when the transfer belt is separated from the photosensitive member, the potential gradient becomes as shown in FIG. 9A III after separation, and in the vicinity of the portion where said belt is in contact with the electroconductive driving roller 4, its surface potential becomes substantially 0 V.

As described above, since a voltage of $-1000$ V is applied on the electroconductive roller 8, the surface potential of the transfer belt from the driving roller 4 to the electroconductive roller 8 shows the potential gradient as shown in FIG. 9A.

According to the device of this example, the surface potential gradient of the transfer belt can be controlled more finely, whereby there is no "scattering of toner", and faithful transfer of the image on the photosensitive member and sure separation of the transfer material can be carried out at stable transfer efficiency without disturbing the image.

Figure 10:
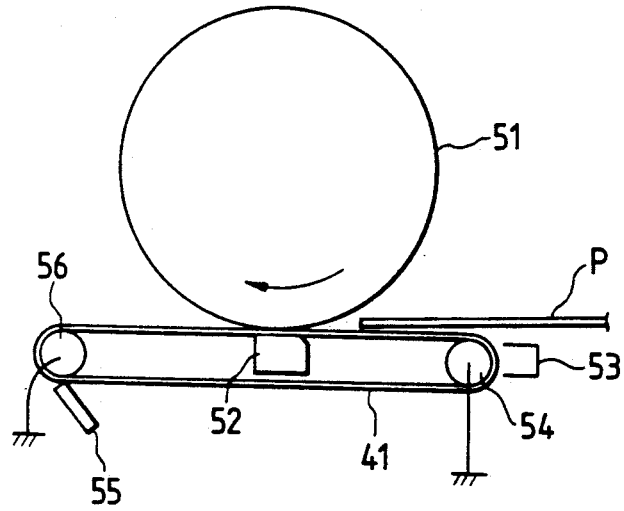
FIG. 10 and FIG. 11 are schematic sectional views of the transfer-conveying machine provided with the belt according to the present invention.

FIG. 10 is a schematic sectional view of the transfer and conveying means by use of the belt of the present invention. The toner image formed on the photosensitive drum 51 which is an electrostatic latent image carrier is transferred onto the transfer material P through the action of the transfer charger 52 provided at the position opposed to the photosensitive drum 51 with the belt 41 sandwiched therebetween. Then, the transfer material P is electrostatically adsorbed onto the belt 41 and conveyed stably. The belt 41 rotates at the same speed as the photosensitive drum 11 by receiving driving force from the first roller 54 or the second roller 56. Here, the first roller 54 and the second roller 56 have electroconductivity, and are earthed respectively. The toner attached on the belt 41 is cleaned by the cleaner 55. Because charges of the opposite polarity to charging for transfer are accumulated on the belt surface by discharging in air during peeling of the photosensitive drum and separating the transfer material P from the belt 41, there is provided on the belt 41 a deelectrifier 53 for removing said charges. On the deelectrifier is applied a direct current of the polarity opposite to transfer charging or an alternate current.

EXAMPLE

In the image forming device shown in FIG. 10, as the transfer belt 41, a polyethyleneterephthalate resin was extruded into a tube, and further biaxially stretched to obtain a tube of desired dimensions. In this Example, the dimensions were made 80 mm in diameter, 230 mm in width and 30 μm in thickness. Further, a polyolefin type thermoplastic elastomer was similarly extrusion molded to obtain a tube of 79.4 mm in diameter, 230 mm in width and 100 μm in thickness. At this time, carbon black was mixed into the elastomer in an amount within the range of 5 to 30% by weight to obtain a desired resistance value. The polyethyleneterephthalate tube and the elastomer tube thus obtained were superposed on one another, and adhered with an adhesive to obtain a belt 41. Here, the thickness of the adhesive layer was 20 μm and the total thickness of the transfer belt 41 became 150 μm.

By use of the transfer belt thus obtained, 10 sheets of paper were successively passed by means of the transfer-conveying device shown in FIG. 10 by varying the resistance of the elastomer layer of the inner layer by varying the amount of carbon black dispersed, and the change in transfer efficiency is shown below. At this time, the experiments were conducted at a paper delivery speed of 100 mm/sec., by use of an organic photoconductive member (hereinafter abbreviated as OPC) sensitized to the longer wavelength side as the photosensitive drum 51 to form a latent image and a semiconductor laser (not shown), and by use of the reversal developing system which developed the exposed portion with one component magnetic toner of negative polarity. Further, the transfer charger 52 performed corona discharging by a constant current control at 200 μA, and the deelectrifier 53 was permitted to perform corona discharging by a constant current control at 150 μA. The experimental results are shown in Table 1.

TABLE 1

| Volume resistivity of elastomer layer | Transfer efficiency of first sheet | Transfer efficiency of 10th sheet |
|---|---|---|
| $10^6$ Ω cm | 40% | 40% |
| $10^7$ Ω cm | 65% | 65% |
| $10^8$ Ω cm | 80% | 80% |
| $10^9$ Ω cm | 83% | 83% |
| $10^{10}$ Ω cm | 87% | 85% |
| $10^{11}$ Ω cm | 91% | 87% |
| $10^{12}$ Ω cm | 90% | 86% |
| $10^{13}$ Ω cm | 88% | 83% |
| $10^{14}$ Ω cm | 86% | 80% |
| $10^{15}$ Ω cm | 83% | 72% |
| $10^{16}$ Ω cm | 80% | 65% |

From the experimental results, it can be seen that when practically sufficient value as the transfer efficiency is made 75% or more, more preferable value 80% or more, the volume resistivity value necessary for the elastomer value is $10^8$ to $10^{14}$ Ω cm. The reason may be considered to be that if the resistance is too low, charges for transfer will be leaked through the elastomer layer, whereby no transfer electrical field with sufficient strength will exist, while if the resistance is too high, the charge-up phenomenon will occur, whereby transfer efficiency will be gradually lowered.

On the other hand, the thickness of the elastomer layer affects the electrostatic capacity of the belt 41 due to the high resistance layer, and if the thickness is too thick, the electrostatic capacity will become small and therefore transfer electrical field cannot be made strong, whereby the transfer efficiency is affected. Table 2 shows the results in which transfer efficiency was measured by varying the thickness of the elastomer layer under the same conditions as in the above experimental examples with the volume resistivity value of the elastomer layer which is the high resistance layer being set at $10^{11}$ Ω cm.

TABLE 2

| Thickness of elastomer layer | Transfer efficiency of first sheet | Transfer efficiency of 10th sheet |
|---|---|---|
| 50 μm | 95% | 90% |
| 100 μm | 91% | 87% |
| 150 μm | 86% | 85% |
| 200 μm | 82% | 80% |
| 250 μm | 78% | 77% |
| 300 μm | 76% | 75% |
| 350 μm | 72% | 72% |

From the experimental results, it is required that the practical elastomer thickness should be 300 μm or less, preferably 200 μm or less. Whereas, an elastomer is generally an elastic body and weaker in permanent deformation, tensile strength, abrasion resistance, etc. as compared with resins. For this reason, when used as the belt for transfer, no sufficient durability can be obtained with only the elastomer layer, and a thickness of 300 μm or more is required for obtaining particularly sufficient strength characteristic to stand successive paper passages of 300,000 sheets or more. On the other hand, as in the present invention, by having a resin layer having excellent characteristics of abrasion resistance, tensile strength, permanent deformation, etc. particularly with a tensile strength of 150 kg/cm$^2$ or higher, preferably 300 kg/cm$^2$ or higher as the surface layer on the surface, sufficient durability can be obtained even if the elastomer layer may be thin. Further, the transfer efficiency becomes better as the surface resin layer is thinner, but it is extremely thin, durability becomes inferior for the same reason as described above.

According to the investigation by the present inventors, the resin layer of the surface having a thickness of 20 to 100 μm, more preferably 20 to 70 μm, is excellent in transfer efficiency and durability. On the other hand, surface smoothness is required from cleaning characteristic, and the resin layer satisfying the characteristics as mentioned above may include polyethyleneterephthalate, fluorine resins such as tetrafluoroethylene resin, tetrafluoroethylene-hexafluoropropylene resin, tetrafluoroethylene-perfluoroalkoxyethylene resin, polyvinylidene fluoride resin, etc., polyethylene, polyamide, polyimide, polycarbonate, polysulfone, etc., more preferably polyethyleneterephthalate, polyamide, polyimide, polycarbonate, polysulfone, etc.

Next, durability performance of the transfer belt of this Example is described in detail together with Comparative example.

As the transfer belt 1, as described above, on a polyethyleneterephthalate tube with a thickness of 30 μm is superposed on its inner layer a polyolefin type thermoplastic elastomer tube with a thickness of 100 μm through an adhesive layer with a thickness of 20 μm. At this time, the resistance value of the polyethyleneterephthalate layer of the surface layer is $10^{15}$ Ω cm or higher, and the resistance value of the polyolefin type thermoplastic elastomer is controlled to $10^{11}$ Ω cm. On the other hand, for the transfer belt of Comparative example, two kinds of belts with total thicknesses of 150 μm and 350 μm, having polyolefin type thermoplastic elastomer tubes with thicknesses of 100 μm and 300 μm and a resistance value controlled to $10^{11}$ Ω cm as the inner layer superposed through an adhesive layer of 20 μm on the surface layer of a polyolefin type thermoplastic tube with a thickness of 30 μm and a resistance value of $10^{15}$ Ω cm or higher were prepared. By use of these transfer belts, paper passage tests were conducted under the conditions described in Example to obtain the results shown below.

The transfer belt 1 having the polyethyleneterephthalate layer provided for the surface layer of this Example was free from abnormality in the paper passage durability test of 100,000 sheets, transfer efficiency of 85 to 90% or higher could be constantly obtained and good image quality with little scattering could be maintained. On the other hand, when the transfer belts shown in Comparative example were subjected to the same paper passage durability test, both failed to clean the toner attached on the transfer belt after passage of 6000 to 8000 sheets, and back staining of the transfer material occurred. Further, the belt with the total thickness of 150 μm had cracks formed at the end portion after about 15,000 sheets until broken at 30,000 sheets to be no longer useful. On the other hand, the belt with the total thickness of 350 μm had cracks formed at the end portion on passage of 100,000 sheets, but the paper passage test of 100,000 sheets could be completed. However, the belt could give only about 70 to 75% of the initial stage transfer efficiency, and also image quality had slightly conspicuous scattering.

Figure 11:
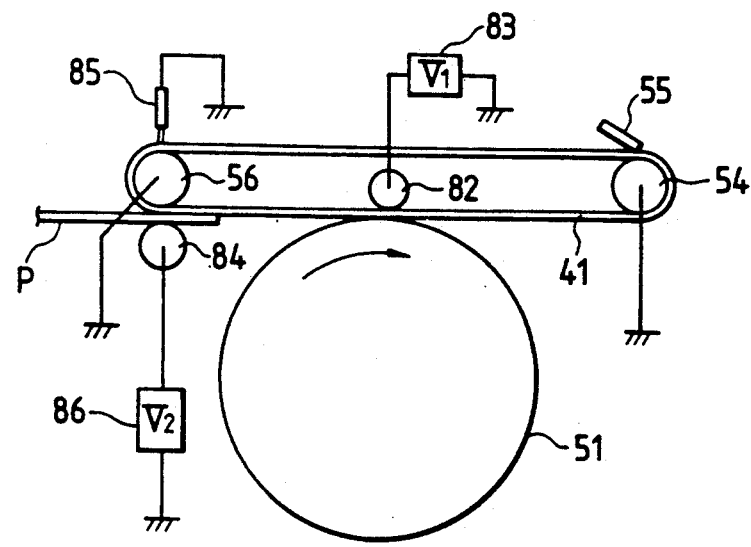

FIG. 11 is a schematic sectional view of the transfer-conveying device for practicing the present invention. The toner image formed on the photosensitive drum 51 is transferred by the electrical field of the transfer roller 42 onto the transfer material P previously electrostatically adsorbed on the belt by the roller for adsorption 84. The toner on the belt 41 is cleaned by the cleaner 55, and the charges of the opposite polarity to the transfer electrical field existing on the belt 41 are deelectrified by the earthed deelectrifying brush 85. At this time, a constant voltage of 0.5 to 3 kV of the opposite polarity to the toner is applied on the transfer roller 82 by the power source 83. Also, on the roller for adsorption 84 is applied a voltage of 0.2 to 1.5 kV of the same polarity as the toner by the power source 86 to inject charges onto the transfer material and induce charges of the opposite polarity to said charges in the high resistance layer of the belt 41, whereby the transfer material P is strongly electrostatically adsorbed onto the belt 41 through the electrostatic force between the both charges. As the result, the transfer material P can be conveyed against the gravitational force.

To describe in more detail, for the transfer roller 82, an electroconductive rubber such as EPDM, CR, NBR, silicone rubber, etc. having a volume resistivity of $10^6$ Ω cm or less and a hardness of 20° to 50° (JIS A) or an electroconductive sponge such as urethane, silicone, etc. having a hardness of 15 to 40 (ASKER C) can be used. For the roller for adsorption 84, similarly an electroconductive rubber roller such as EPDM, CR, NBR, silicone rubber, etc. can be used to improve adhesion of the transfer material onto the belt 41.

In the constitution of this Example, the electrostatic adsorbing force of the transfer material P onto the belt 41 is required to be sufficiently strong. According to the investigation by the present inventors, the electrostatic force between the transfer material P and the belt 41 depends on the resistance and the smoothness of the surface layer of the belt 1, and particularly, the resistance value of the surface layer represents the charge retaining ability of the belt 41, which affects the adsorbing force when the paper which is the transfer material became lower under high temperature and high humidity conditions (e.g. 35° C., 85%).

In this Example, a belt similar to the above Example but with a diameter of 150 mm was used. The experiments were carried out by controlling the resistance values by dispersing and mixing surfactants or carbon black into the polyethylene-terephthalate layer used as the insulating layer of the surface layer, and the adsorbing forces onto the belt 1 of the transfer material P were evaluated to obtain the results shown in Table 3. The paper delivery speed at this time was 30 mm/sec., and other conditions for forming images were made the same as in the above Example. As the transfer material, a paper with a basis weight of 58 g/m² left to stand under 35° C., 85% for 2 days was used, a voltage of −500 V applied on the roller for adsorption 84, and a voltage of +1.5 kV applied on the transfer roller 42 in carrying out the experiments.

TABLE 3

| Resistance value of trasfer belt surface | Adsorbing force | Half-life of transfer belt surface potential |
| --- | --- | --- |
| $10^{17}$ Ω cm | O | — |
| $10^{16}$ Ω cm | O | — |
| $10^{15}$ Ω cm | O | 200 sec. |
| $10^{14}$ Ω cm | Δ | 25 sec. |
| $10^{13}$ Ω cm | x | 3 sec. |

Here, in evaluation of adsorbing force, O indicates that the transfer material P is completely adhered until separation, Δ the state where the transfer material P is slightly apart from the belt 1 in the vicinity of the separated portion and x the state where the transfer material P is separated from the belt 1 immediately after separation of the transfer material P from the photosensitive drum. The belt surface potential half-life is the result of measurement of time transition of the surface potential by a surface potentiometer after charging the belt surface at a constant potential.

For the transfer material and the belt to obtain sufficient adsorbing force even under such high temperature and high humidity, it can be understood that the resistance of the belt surface layer is required to be $10^{14}$ Ω cm or higher, preferably $10^{15}$ Ω cm or higher. This may be considered to be due to the fact that the charges for adsorption given on the paper are prevented from leaking from the paper lowered in resistance and the transfer belt surface layer. Also, when having a charge feeding member (the roller for adsorption 44 in this Example) in contact with the belt 1, if there is pinhole, etc. in the insulating layer of the belt surface, voltage will be leaked therefrom. Accordingly, as the surface layer of the belt 1, a pinholeless insulating layer is desirable. Further, when a filler with low electrical resistance is mixed in the surface insulating layer, similar phenomenon is liable to occur, and therefore it is desirable to mix no filler into the surface insulating layer.

Thus, as the insulating layer having a resistance value satisfying the above characteristics in which pinhole can exist with difficulty, there can be used preferably a resin layer of polyethyleneterephthalate, tetrafluoroethylene-perfluoroalkoxyethylene, tetrafluoroethylene-hexafluoropropylene, polyvinylidene fluoride, polyethylene, polyamide, polyimide, polycarbonate, polysulfone, etc.

Further, in the present constitution, sufficiently excellent transfer efficiency, image quality etc. can be obtained for the same reasons as described in the above Example.

As described above, according to the present invention, in an image forming device provided with a photosensitive member and a transfer belt in contact therewith which is constituted so that the transfer material may be adsorbed and conveyed on said transfer belt, the surface potential of the transfer belt can be controlled so as to have a desired potential gradient, whereby faithful transfer can be effected at high transfer ratio and stably with excellent environmental characteristic without scattering or inner drop-out of toner, thus contributing greatly to images of good quality to be obtained.

What is claimed is:

1. An image forming device comprising:
   an image carrier; and
   a transfer material adsorbing and conveying means for attaching a transfer material by an electrostatic force and for conveying in a direction of movement the transfer material to a position in which said image carrier forms a transfer nip with said transfer material adsorbing and conveying means, said transfer material adsorbing and conveying means comprising,
   electrical field generating means for generating an electrical field downstream of the transfer nip with respect to the direction of movement, said electrical field generating means being arranged on a side of said transfer material adsorbing and conveying means opposite to a surface in contact with the transfer material on said transfer material adsorbing and conveying means and said electrical field generating means comprising a contact-type electricity feeding means,
   an insulating layer having a volume resistivity of at least $10^{14}$ Ω cm arranged on the side of the surface of said transfer material adsorbing and conveying means in contact with said image carrier, and
   a high resistance layer having a volume resistivity of between $10^8$ to $10^{14}$ Ω cm disposed on the opposite side of said transfer material adsorbing and conveying means,
   wherein a surface potential of the side of said transfer material adsorbing and conveying means in contact with the transfer material resulting from said electrical field generating means forms a potential gradient having a peak proximate to a position downstream of the transfer nip with respect to the direction of movement.

2. An image forming device according to claim 1, wherein said insulating layer of said transfer material adsorbing and conveying means has a thickness of 20 to 150 μm.

3. An image forming device according to claim 1, wherein said high resistance layer of said transfer material adsorbing and conveying means has a thickness of 50 to 300 μm.

4. An image forming device according to claim 1, wherein said insulating layer of said transfer adsorbing and conveying means comprises a resin selected from the group consisting of polyester, fluorine resin, polyimide, polyether ether ketone, polycarbonate, polyethylene, polyamide and polysulfone.

5. An image forming device according to claim 1, wherein said high resistance layer is formed by addition of a filler to a thermoplastic elastomer, said filler being selected from the group consisting of electroconductive inorgnic fillers and semiconductive inorganic fillers.

6. An image forming device according to claim 1, wherein said contact electricity feeding means is a means selected from the group consisting of electroconductive brush, electroconductive roller and electroconductive rubber blade.

* * * * *

UNITED STATES PATENT AND TRADEMARK OFFICE
CERTIFICATE OF CORRECTION

PATENT NO. : 5,172,173
DATED : December 15, 1992
INVENTOR(S) : GOTO et al.

It is certified that error appears in the above-indentified patent and that said Letters Patent is hereby corrected as shown below:

COLUMN 1

Line 7, "Invention:" should read --Invention--.
    Line 12, "Art:" should read --Art--.
    Line 34, "material" should read --materials,--.
    Line 36, "caused" should read --caused by--.

COLUMN 2

Line 10, "Moreover" should read --Moreover,--.

COLUMN 4

Line 12, "characteristic" should read --characteristics--.
    Line 57, "Moreover" should read --Moreover,--.

COLUMN 8

Line 14, "from" should read --form--.

COLUMN 9

Line 30, "be" should read --be a--.

COLUMN 10

Line 59, "alternate " should read --alternating--.

UNITED STATES PATENT AND TRADEMARK OFFICE
CERTIFICATE OF CORRECTION

PATENT NO. : 5,172,173
DATED : December 15, 1992
INVENTOR(S) : GOTO et al.

It is certified that error appears in the above-indentified patent and that said Letters Patent is hereby corrected as shown below:

<u>COLUMN 11</u>

Line 56, "in" should read --in the--.

<u>COLUMN 16</u>

Line 62, "inorgnic" should read --inorganic--.

Signed and Sealed this

First Day of February, 1994

Attest:

BRUCE LEHMAN

Attesting Officer Commissioner of Patents and Trademarks